(No Model.)
S. P. SWARTZ.
SOLDERING IRON.
No. 347,307. Patented Aug. 10, 1886.
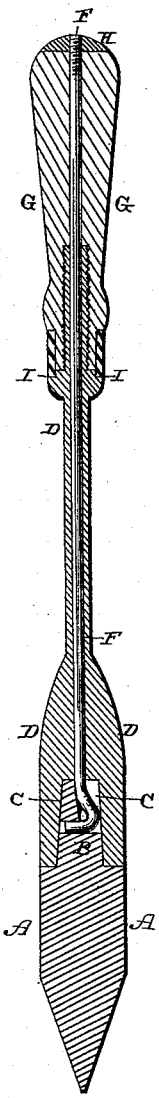
Witnesses:
R. F. Gardner
A. S. Pattison
Inventor:
S. P. Swartz
per F. A. Lehmann,
Atty.

UNITED STATES PATENT OFFICE.

SAMUEL P. SWARTZ, OF ALLENTOWN, PENNSYLVANIA.

SOLDERING-IRON.

SPECIFICATION forming part of Letters Patent No. 347,307, dated August 10, 1886.

Application filed June 14, 1886. Serial No. 205,141. (No model.)

*To all whom it may concern:*

Be it known that I, SAMUEL P. SWARTZ, of Allentown, in the county of Lehigh and State of Pennsylvania, have invented certain new and useful Improvements in Soldering-Irons; and I do hereby declare the following to be a full, clear, and exact description of the invention, such as will enable others skilled in the art to which it pertains to make and use it, reference being had to the accompanying drawing, which forms part of this specification.

My invention relates to an improvement in soldering-irons; and it consists in the combination of the soldering-point provided with a perforated tenon or extension on its inner end, a metallic rod, which is detachably hooked to this extension, the hollow shank, through which the rod passes, and the wooden handle provided with a nut at its outer end to screw upon the outer end of the rod which is connected to the soldering-point, all of which will be more fully described hereinafter.

The object of my invention is to form upon the soldering-point a projection which will fit in a suitable socket in the metallic portion of the handle, and thus enable the point to retain its heat, and to fasten the point to the handle by an intermediate metallic rod, which connects all of the parts together.

The accompanying drawing represents a vertical section of a soldering-iron which embodies my invention.

A represents a soldering-point, which has a suitably-shaped projection, B, formed upon its inner end, and which projection fits in a correspondingly-shaped socket, C, which is made in the inner end of the hollow metallic shank D. The inner end of this metallic shank D is of the same diameter as the soldering-point, and bears directly against the shoulder which is formed on the point, so as to form an intimate contact between the two parts. The two parts being thus brought in contact both by the tenon and socket and the ends or shoulders, become thoroughly heated, and the metallic shank D, instead of robbing the point of its heat, helps it to retain it. Through the projection or tenon B is formed a suitable opening, in which the hooked end of the rod F is made to catch. This rod F is screw-threaded at its outer end, and is made to pass through the metallic portion D of the handle and into the handle G, which is provided with a nut, H, at its outer end. The outer metallic shank, D, is also made screw-threaded at its outer end, and is provided with a shoulder, I, which acts as a stop for the wooden handle. The wooden handle being passed over the outer ends of the metallic rod and the shank D, screws upon the shank D, while the metallic rod enters the nut H, and thus the handle is screwed upon two different parts at once. In screwing the handle into position, a pull is exerted upon the soldering-point through the metal rod, so as to draw it into position upon the inner end of the shank D, and thus the different parts are held rigidly together. By unscrewing the handle the point and the rod connected to it can be separated from the shank D, and then the rod can be detached from the point.

Having thus described my invention, I claim—

The combination of the soldering-point provided with a tenon, the rod connected to the tenon, the nut which screws upon the outer end of the rod, the hollow metallic shank D, provided with a socket to receive the tenon, and the handle G, substantially as shown and described.

In testimony whereof I affix my signature in presence of two witnesses.

SAMUEL P. SWARTZ.

Witnesses:
H. E. PETERS,
JACOB D. BURGER.